United States Patent [19]

Vice

[11] 4,007,887
[45] Feb. 15, 1977

[54] STRAP ROLLING DEVICE
[75] Inventor: Lester J. Vice, Hillsboro, Oreg.
[73] Assignees: Eugene H. Braukman, Cornelius; Gerald A. Kramer, Forest Grove, both of Oreg.
[22] Filed: Sept. 26, 1975
[21] Appl. No.: 616,937
[52] U.S. Cl. .................................. 242/86.5 R
[51] Int. Cl.$^2$ ................................ B65H 17/46
[58] Field of Search ............... 242/86.5 R, 67.1 R, 242/86.52, 74

[56] References Cited
UNITED STATES PATENTS

| 498,307 | 5/1893 | Rule | 242/86.5 R |
| 1,009,673 | 11/1911 | Lang | 242/74 |
| 3,737,113 | 6/1973 | Yabe | 242/74 |
| 3,827,650 | 8/1974 | Stevens | 242/86.5 R |
| 3,831,545 | 8/1974 | Cain | 242/86.5 A |

Primary Examiner—Edward J. McCarthy
Attorney, Agent, or Firm—James D. Givnan, Jr.

[57] ABSTRACT

A device for temporary mounting on a truck or trailer bed permitting the convenient rolling of load straps on binders enabling compact stowage of same. A strap, subsequent to unfastening from the load, is wound about a spindle assembly supported in a detachable manner by a frame member. The spindle about which the strap is rolled may be separated from the frame member, thereby releasing a rolled strap. The spindle assembly and the frame jointly embody means for axial disengagement of the spindle assembly while a lengthwise opening in the spindle permits axial extraction of the spindle from the rolled strap.

4 Claims, 7 Drawing Figures

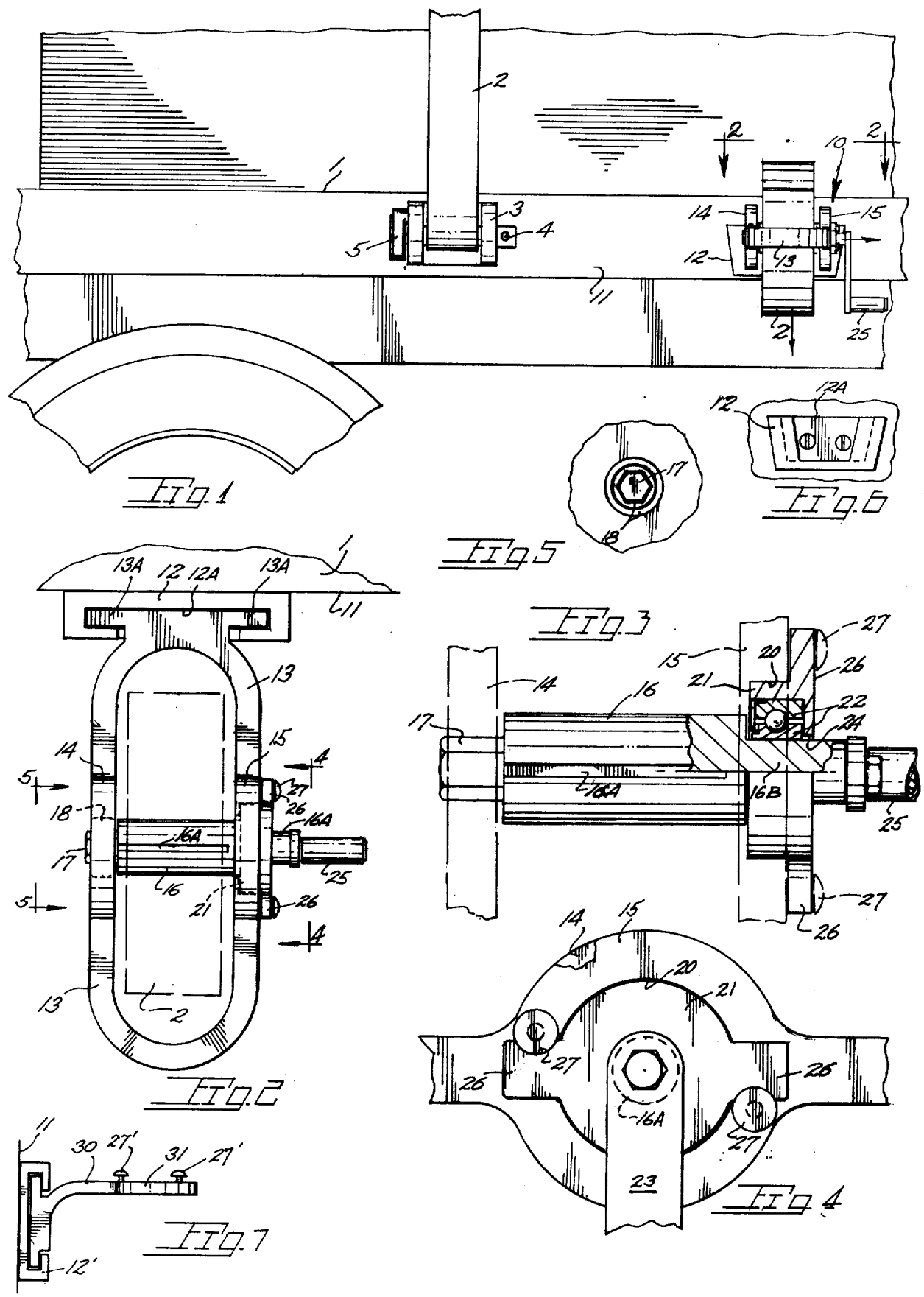

4,007,887

STRAP ROLLING DEVICE

BACKGROUND OF THE INVENTION

The present invention relates generally to a device for rolling elongate material such as fabric hold down straps or binders used to secure flat bed trailer loads.

In common use throughout the trucking industry are lengthy straps (also termed bands, binders, etc.), usually of a woven fabric material securing a load to the trailer or truck bed. Such straps may vary in length from thirty to sixty feet and in use are tightened on the load by winches at the trailer sides. A conventional commercial trailer may be equipped with several such straps. Considerable time is spent by the driver, subsequent to unloading of the trailer, in winding up of the straps enabling compact stowing in the truck. As the straps are lengthy they must be wound in a careful, time consuming manner to assure compact stowage and avoidance of entanglement with other straps. Presently, considerable time is spent by the trucker in winding the straps as currently such a task is done manually without the aid of any tool.

A related problem exists in winding of any elongate flexible which must be stowed in a compact manner.

SUMMARY OF THE PRESENT INVENTION

The present invention is embodied within a strap rolling device adapted for temporary mounting on mobile equipment for the purpose of winding elongate material. The spindle assembly of the present device releasably retains the inner end of the material being rolled and upon completion of the rolling operation is readily separable from the rolled material in a convenient manner.

The present device includes a frame for removable attachment to a supporting bracket which, in turn, is mounted on the bed of the vehicle. Said frame serves to support a removable spindle assembly which includes bearing means within which is journalled a spindle about which is wound the strap, binder or other elongate material.

Important objectives of the present invention include: The provision of a device for rolling elongate material such as load securing straps, said device including a frame for temporary mounting within a vehicle mounted bracket; the provision of a spindle assembly including a bearing cup detachably mounted on said frame to facilitate strap rolling and release of the strap when rolling is completed; the provision of a device for rolling elongate material wherein a spindle assembly receives a quantity of rolled material with opposite ends of the spindle being detachably supported by suitable friction-reducing bearings.

BRIEF DESCRIPTION OF THE DRAWING

In the accompanying drawing:

FIG. 1 is a fragmentary side elevational view of a mobile load supporting bed provided with conventional strap mounting means and with a strap rolling device embodying the present invention;

FIG. 2 is a plan view of the present device taken along line 2—2 of FIG. 1;

FIG. 3 is an enlarged plan view of a spindle assembly with the supporting frame shown in phantom lines and with fragments broken away for illustrative purposes;

FIG. 4 is an elevational view of one end of the spindle assembly taken along line 4—4 of FIG. 2;

FIG. 5 is an elevational view taken along line 5—5 of FIG. 2 showing a fragment of the frame and spindle support bearing housed therein;

FIG. 6 is an elevational view of mounting means for supporting the present tool in a detachable manner; and FIG. 7 is a plan view of a modified frame for the present device.

DETAILED DESCRIPTION OF THE PREFERRED EMBODIMENTS

With continuing reference to the accompanying drawing wherein applied reference numerals indicate parts similarly identified in the following specification, the reference numeral 1 indicates the bed of a truck or trailer of the type suited for transporting loads confined thereon by straps or binders 2. Such binders are conventionally tensioned at one end by a winch 3 while the opposite or unseen end of the binder is in hooked engagement with a retainer secured to the bed. Typically, the straps 2 confine the load in place on bed 1 by being tensioned thereover by means of a lever being inserted within the winch socket at 4. A pawl 5 retains the winch roller against rotation in an unwinding direction until disengaged by the trucker in an unloading operation. The foregoing is provided simply for the purpose of providing a better understanding of the present invention a description of which follows.

Indicated generally at 10 is the present strap rolling device temporarily mounted in place on the side rail 11 of a mobile truck or trailer bed 1. A bracket 12 constitutes mounting means and has an upwardly opening inset area 12A (FIG. 6) to permit convenient mounting and removal of the present device during its use. A frame member of the device is indicated at 13 and includes flanges 13A for engagement with bracket 12. The flanges desirably taper downwardly toward one another to provide a snug fit within bracket 12. Frame 13 is closed at its ends. Enlarged circular portions 14 and 15 have open centers to receive the following described spindle assembly.

A spindle assembly, best shown in FIG. 3, is adapted for insertion into engagement with frame 13 and includes a spindle 16 intermediate the parallel frame members and defining an open ended lengthwise extending groove at 16A. An extension 17 is received within a correspondingly shaped aperture constituting the inner race of a bearing indicated at 18. The extension is removed from the inner race by axial movement of the spindle assembly as later explained. Frame enlargement 15 is shouldered at 20 to receive a bearing cup 21 of the spindle assembly within which is retained the races of a ball bearing 22 including a shield to prevent the entry of foreign material. A reduced neck portion 16A of the spindle is journalled within the inner race of bearing 22 and extends outwardly through a frame aperture 24 to receive a crank 23 provided with a hand grip 25. The inner race of bearing 22 is in friction tight engagement with reduced spindle portion 16B to support the latter for rotation. To retain bearing cup 21 in place within the internally shouldered frame enlargement 15 I provide extension 26, integral with said cup and extending therebeyond for engagement with retainers 27 carried by said enlarged frame portion. While retainers 27 are shown as being of the type having enlarged heads for retention of bar 26 it will be understood that other types of retention means may be satisfactorily employed.

In operation, the truck operator will mount frame member 13 in mounting means 12 at the unloading site whereupon, as each strap 2 is pulled free of winch 3, the strap end is threaded into spindle groove 16A. Rotation of crank 23 will cause the strap to be rolled onto spindle 16 with bearing cup 21 being held against movement by cup extensions 26. With attention to FIG. 4, upon completion of the strap roll, extensions 26 are rotated counterclockwise to disengage retainers 27 whereupon the spindle assembly may be axially extracted from frame member 13. During such extraction the inner end of the rolled strap will be released from spindle groove 16A to permit the release of the rolled strap.

In the modified form of frame member in FIG. 7, the frame includes a single arm-like extension 30 with a circular enlargement 31 of the same internal configuration as the earlier described enlargement 15 of the first frame member. Where the straps to be rolled are of lesser size and weight the spindle assembly need only be supported at one end; otherwise its function is as earlier described.

While I have shown but a few embodiments of the invention it will be apparent to those skilled in the art that the invention may be embodied still otherwise without departing from the spirit and scope of the invention.

Having thus described the invention what is claimed and desired to be secured under a Letters Patent is:

1. A device for temporary attachment to a mobile base for rolling up elongate flexible material, said device comprising,
   a frame member including retention means,
   means detachably coupling said frame member to said mobile base, and
   a spindle assembly including a spindle defining a longitudinally orientated open ended opening to receive one end of the flexible material to be rolled in a manner permitting axial separation of the subsequently rolled material and said spindle, said spindle assembly further including retention means cooperating with the first mentioned retention means and a bearing housing within which one end portion of said spindle is journaled, said bearing housing being in detachable engagement with said frame member to permit axial extraction of the spindle assembly from material rolled thereon and the frame member.

2. The device claimed in claim 1 wherein said frame member includes parallel side members interconnected at their adjacent ends to form a closed end frame member within which the material is rolled.

3. The device claimed in claim 2 wherein one of said side members includes a bearing for inserted reception of the spindle end.

4. The device claimed in claim 1 wherein said frame member includes a flanged portion and said coupling means comprises a bracket having an upwardly opening recess to receive said flanged portion of said frame member.

* * * * *